May 5, 1925.
W. E. HOKE
1,536,714
APPARATUS FOR AND METHOD OF MAKING SIMILAR ARTICLES
Filed April 4, 1921
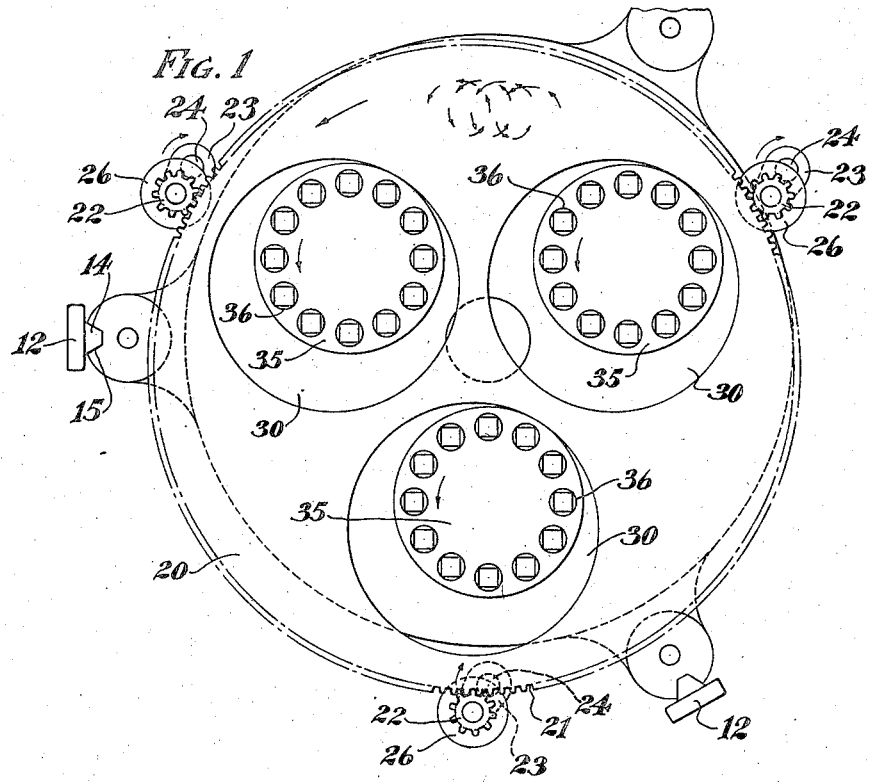
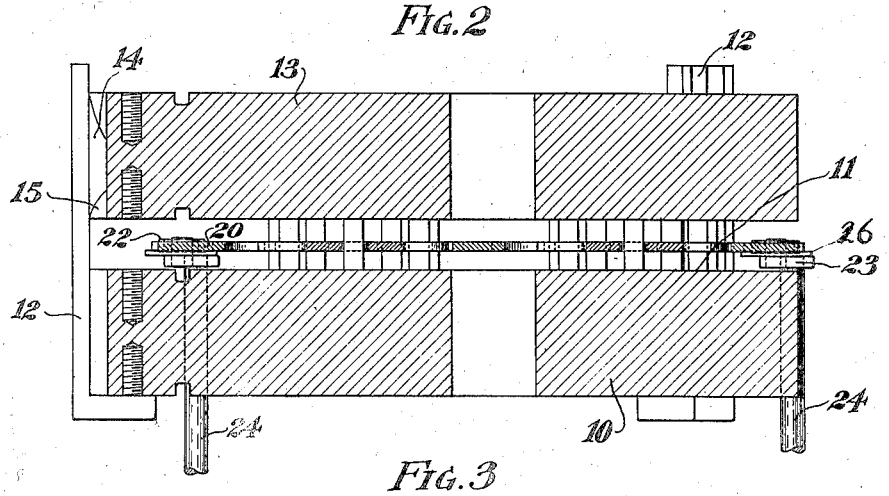
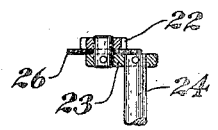
Inventor
Wm. E. Hoke
By Joseph K. Schofield
Attorney Patented May 5, 1925.

1,536,714

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

APPARATUS FOR AND METHOD OF MAKING SIMILAR ARTICLES.

Application filed April 4, 1921. Serial No. 458,280½.

*To all whom it may concern:*

Be it known that I, WILLIAM E. HOKE, a citizen of the United States, residing at St. Louis, in the State of Missouri, have invented certain new and useful Improvements in Apparatus for and Methods of Making Similar Articles, of which the following is a specification.

This invention relates to an apparatus for and method of grinding similar articles so that they may be simultaneously ground to a predetermined definite and precise dimension. More particularly, this invention relates to an apparatus for and method of grinding a plurality of similar precision gages having opposite plane parallel surfaces at a predetermined distance apart.

An object of the present invention is to provide an improved apparatus for and method of grinding or lapping a plurality of similar articles grouped in a plurality of main groups so that the articles, such as precision gages, may be simultaneously ground to predetermined identical dimensions and be provided with opposite plane parallel end faces. I accomplish the objects of the invention by grouping the gages, or other articles to be ground, preferably in three equally spaced groups, each group containing a plurality, preferably twelve or more, of the articles to be ground.

One feature which enables me to make similar articles having opposite plane parallel end faces at predetermined identical distances apart, is that the articles to be made having their end faces so formed, are disposed and operated between plane surfaced laps in a plurality of groups as three, four or six groups so arranged relative to the laps that the weight, or pressure of one of the laps, exerted during the lapping operation is divided equally between the groups. Also during the lapping operation one of the laps may adjust itself as to parallelism relative to the other lap and the distance between the two laps may be varied in accordance with the different heights of the articles being lapped. At all times during the lapping operation the entire weight of one of the laps rests upon the articles being lapped.

Another feature which is advantageous and which aids in accomplishing very close approximation to the predetermined dimension is that in each group of articles, the individual articles are symmetrically disposed, and each group contains an equal number of articles so arranged that they may rotate both about their common and also their individual centers or axes.

The invention is preferably carried out in an apparatus having a spider, or carrier, in which the articles to be ground are mounted. This spider in the embodiment of the invention selected for illustration has three large circular openings equally spaced from each other and equally spaced about the center of the spider. Within each of these openings, or orifices, I provide additional holders or spacing members each having a plurality of openings preferably arranged in a circle near the periphery of these holders. Each of these openings in the holders or spacing members is large enough to permit but one of the articles to be ground being located therein. The opening is such that the article is free to rotate about its individual center or axis.

In order to accomplish the necessary operative movements between the groups of articles and the laps, I preferably provide the outer periphery of the spider or carrier with gear teeth extending entirely around its periphery which engage small pinions mounted at the ends of short cranks. Preferably three of these cranks and pinions are provided, all of which rotate in synchronism so that the spider is given a curved movement back and forth between the laps and simultaneously given a precessional movement about its own center. The particular mechanism for producing the lapping movements between the articles and laps forms no part of the present invention and any mechanism adapted to give the articles the necessary lapping movements may be substituted for the mechanism shown.

With the above and other objects in view, my invention consists in the features of construction and operation set forth in the following specification and illustrated in the accompanying drawing.

In the accompanying drawing annexed hereto, and forming a part of this specification, I have shown my invention embodied in a gage grinding or lapping machine, but it will be understood that the invention can be otherwise embodied and that the drawing is not to be construed as defining, or limiting, the scope of the invention, the claims appended to this specification, being relied upon for that purpose.

In the drawing:

Figure 1 is a plan view of an apparatus for carrying out the present invention, the upper lap being removed.

Fig. 2 is a vertical sectional view of the apparatus taken on line 2—2 of Fig. 1.

Fig. 3 is a detail view of a part of the spider actuating means.

In the above mentioned drawing I have shown but one modification of the invention which is now deemed preferable, but it is to be understood that changes and modifications may be made within the scope of the appended claims without departing from the spirit of the invention.

Briefly, my invention in its broadest aspect comprises the following principal elements; first, a lower lap mounted rigidly in position or forming the base of a lapping machine or device; second, an upper lap positioned above the first lap and preferably adapted to be held from rotation but arranged so that it may rest on the upper surfaces of the articles to be ground, and adjust itself relatively thereto; third, a spider having a plurality of openings spaced preferably at equal distances from each other and disposed symmetrically about its center; fourth, article holders or spacing members within each of these openings and arranged to retain the individual articles to be ground in a symmetrical form within each of the holders or spacing members; and fifth, actuating means for effecting relative lapping movements between the spider and consequently each of the articles to be ground and the laps while the articles are disposed between the adjacent surfaces of the lower and upper laps.

Referring more in detail to the figures of the drawing, at 10 is shown a lap, the upper surface 11 of which is plane and is adapted to be charged with an abrasive or lapping composition. Mounted above the lower lap 10 and held in place by means of vertical guides 12 is an upper lap 13, the lower surface of which is plane and charged with an abrasive. The guides 12 may be of any convenient form, those shown in the drawing being merely diagrammatical. As shown they have a tongue 14 engaging a groove 15 formed in the upper lap 13. Preferably, three equally spaced guides 12 are provided engaging corresponding guideways, or grooves, 15 in the upper lap 13. It will thus be seen that while being held from rotation relative to the lower lap 10, the upper lap 13 may contact with the upper surfaces of the articles to be ground and that it will be supported by these articles.

As the articles are ground to their ultimate dimensions, the upper lap 13 may adjust itself accordingly.

Between the laps 10 and 13 is located a circular carrier member, or spider, 20. This, at its perimeter, is provided with gear teeth 21. These gear teeth 21 engage the teeth of pinions 22 fastened to the end of short cranks 23 which, in turn, are pinned or otherwise fastened to the upper ends of shafts or rods 24. As shown in Fig. 1, three of these cranks 23 are provided each having a pinion 22 in engagement with the teeth 21 of the carrier, or spider, 20. Simultaneous rotation in the same direction of the vertical shafts 24 serves to rapidly move the carrier about in relation to and between the adjacent surfaces of the lap, the effect of the gear teeth 21 and the pinions 22 being to give the carrier, or spider, 20 a slow, advancing or precessional movement about its own center in addition to and simultaneously with the reciprocatory movements imparted to it by the cranks 23.

Immediately below the pinions 22 on the cranks 23 are disks 26 of larger radius than the pinions 22 so that the outer edge of the spider 20 may rest upon and be supported in position by these disks.

Equally spaced from each other in the carrier 20 are orifices, or openings 30, three of these being provided symmetrically disposed about the center of the carrier 20 and equally spaced from each other. Within each of these openings, or orifices, 30 are secondary carriers forming holders, or spacing members 35, each of which is provided with a plurality of openings 36 concentrically disposed about the centers of spacing members 35. As shown in Fig. 1, the holders 35 are of smaller diameter than the openings 30 in which they are mounted. Within the openings 36, of which I preferably provide twelve or more, I mount an equal number of the individual gages, or other articles, to be ground. It is obvious that any number of articles to be ground may be mounted in each of the holders one being mounted in each of the openings provided. Preferably, however, this number should be an even number and also one having a large number of factors so that, if desired, transportation of the articles to different positions within the same groups may be permitted. It is also possible to transpose the articles between the different groups.

The openings 36 within spacing members 35 are preferably arranged as shown, but it is obvious that any other symmetrical disposition of the openings 36 within the spacing members 35 is possible. Also the openings 36 are of such size that the articles to be ground are freely rotatable therein about their own axes.

Any suitable supporting means, not shown, for the spacing members 35, may be provided to maintain these spacing members 35 in proper relation to the spider 20 and articles to be ground.

A description of the method of using the apparatus above described will now be given. With the adjacent surfaces of the laps 10 and 13 charged with an abrasive, or lapping composition, and surfaced to a mechanically true plane, the spider 20 is placed on the upper surface of the lap 10 and the three spacing members 35 placed within the orifices 30.

The gages, or other articles to be ground are then inserted in each of the individual openings 36 provided in the spacing members 35. These articles at the time they are placed in the apparatus are of slightly varying lengths. With the spacers and the articles in position, the upper lap 13 is lowered into position upon the guides 12 so that it rests upon and may adjust or adapt itself to the articles being ground. The shafts 24 are then rotated by any suitable mechanism, not shown, which serve to move the carrier 20 between the surfaces of the laps 10 and 13 so that all parts of the laps are passed over by the articles.

The path of movement of a point in the spider 20 is somewhat as indicated in the dotted arrows in Fig. 1. This is a closed looped curve resulting from the combined reciprocatory, oscillatory, and precessional movements of the spider 20.

As the holders 35 are of less diameter than the openings 30 in which they are located, the holders, or spacing members, 35 are movable about the holes 30 as the carrier, or spider, 20 is oscillated and advanced between the laps 10 and 13. As the circumference of the spacing members 35 is less than the perimeter of the openings 30, and as the spacing members 35 are always forced toward the perimeter of openings 30, a tendency to rotate the spacing members 35 relative to the spider is produced. This rotation of the spacing members 35 is in a direction induced by the precessional movement of the spider 20 by the contact between the spacing members 35 and the spider 20, and is proportional, approximately, to the difference between the circumference of the spacing members 35 and the perimeter of the openings 30.

This constant progressive and reciprocatory movement of the spider 20 about its center and about the laps causes the articles to pass over the entire surfaces of the laps as well as produces a constant rotation of the spacing members 35 relative to the spider. Due to this constant precessional or progressive movement of the spider 20 about the laps 10 and 13 and the resultant continuous rotation of the spacing members 35, the distribution of the articles relative to the laps and to each other is continuously changing. The effect of this is that the articles are all lapped or ground to an identical length between their end faces and the end surfaces of each article are flat and parallel to each other to a high precision.

What I claim is:

1. An apparatus for making similar articles having opposite plane parallel end faces, comprising in combination, a pair of laps having adjacent plane lapping surfaces adapted to contact with the articles being ground, a spider adapted to operate therebetween, said spider having openings therethrough in each of which a plurality of articles may be located, and means within said openings whereby said articles are maintained symmetrically disposed.

2. An apparatus for making similar articles having opposite plane parallel end faces comprising in combination, a pair of laps having adjacent plane lapping surfaces adapted to contact with the articles being ground, a spider adapted to operate therebetween, said spider having openings therethrough in each of which a plurality of articles may be located, and means within said openings whereby said articles are maintained symmetrically disposed and permitted to rotate about the center of said openings and about their own axes.

3. An apparatus for making similar articles having opposite plane parallel end faces, comprising in combination, a pair of laps having adjacent plane lapping surfaces adapted to contact with the articles being ground, a spider adapted to operate therebetween, said spider having three openings, and article spacing members freely movable within said openings, said spacing members having a plurality of openings therethrough in each of which an article may be located.

4. An apparatus for making similar articles having opposite plane parallel end faces, comprising in combination, a pair of laps having adjacent plane lapping surfaces adapted to contact with the articles being ground, one of said laps being free to adapt itself to the articles being ground, a spider adapted to operate therebetween, said spider having three openings, and article spacing members freely movable within said openings, said spacing members having a plurality of openings therethrough in each of which an article may be located.

5. An apparatus for making similar articles having opposite plane parallel end faces comprising in combination, a pair of laps having adjacent plane lapping surfaces adapted to contact with the articles being ground, a spider adapted to operate therebetween, said spider having three circular openings equally spaced from each other and about a common center, and article spacing members freely rotatable within said openings, said spacing members having a plurality of symmetrically disposed openings in which articles may be located.

6. An apparatus for making similar articles having opposite plane parallel end faces comprising in combination, a pair of laps having adjacent plane lapping surfaces adapted to contact with the articles being ground, one of said laps being free to adapt itself to the articles being ground, a spider adapted to operate therebetween, said spider having three circular openings equally spaced from each other and about a common center, and article spacing members freely rotatable within said openings, said spacing members having a plurality of symmetrically disposed openings in which articles may be located.

7. The method of making articles having opposite plane parallel end faces, which comprises grouping said articles in three groups equally spaced from each other and about a common center, each group comprising a plurality of said articles, and operating said articles while retained in said groups between and in contact with adjacent plane surfaces of a pair of laps one of said laps being adjustable as to parallelism relative to the other.

8. The method of making articles having opposite plane parallel end faces, which comprises grouping said articles in three groups equally spaced from each other and about a common center, each group comprising a plurality of said articles, and effecting lapping movements between said articles and laps while retained in said groups between and in contact with adjacent plane surfaces of a pair of laps, one of said surfaces being free to adapt itself to the articles being ground.

9. The method of making articles having plane parallel opposite faces, which comprises grouping said articles in three groups equally spaced from each other and about a common center, each group comprising a plurality of symmetrically disposed articles, and effecting lapping operations upon said articles while retained in said groups between adjacent plane surfaces of a pair of laps, said groups being free to rotate about the axes of said groups, and each article being free to rotate about its own axis.

10. The method of making articles having plane parallel opposite faces, which comprises grouping said articles in three groups equally spaced from each other and about a common center, each group comprising a plurality of symmetrically disposed articles, and effecting lapping operations upon said articles while retained in said groups between adjacent plane surfaces of a pair of laps and while one of said laps rests upon and adjusts itself relative to the upper surfaces of said articles, said groups being free to rotate about the axes of said groups, and each article being free to rotate about its own axis, one of said surfaces being free to adapt itself to the articles being ground.

11. The method of making articles having opposite plane parallel end faces, which comprises grouping said articles in a plurality of groups equally spaced from each other and about a common center, each group comprising a plurality of said articles, and effecting lapping movements between said groups of articles and plane surfaces of laps while retained in said groups, said lapping movements causing said articles to engage substantially the entire lapping surfaces of said laps and to cause said groups to rotate about their centers.

12. The method of making articles having opposite plane parallel end faces, which comprises grouping said articles in a plurality of groups equally spaced from each other and about a common center, each group comprising a plurality of said articles, and effecting lapping movements between said groups of articles and plane surfaces of laps while retained in said groups, said lapping movements causing said groups to move bodily about their common center and to rotate about their centers.

In testimony whereof, I hereto affix my signature.

WILLIAM E. HOKE.